(12) United States Patent
Dos Santos Marujo et al.

(10) Patent No.: US 11,310,176 B2
(45) Date of Patent: Apr. 19, 2022

(54) CONTENT SUGGESTION SYSTEM

(71) Applicant: Snap Inc., Santa Monica, CA (US)

(72) Inventors: Luis Carlos Dos Santos Marujo, Culver City, CA (US); Maria Pavlovskaia, San Francisco, CA (US); William Brendel, Los Angeles, CA (US); Robert Cornelius Murphy, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/952,859

(22) Filed: Apr. 13, 2018

(65) Prior Publication Data

US 2019/0319899 A1 Oct. 17, 2019

(51) Int. Cl.
*G06F 3/0482* (2013.01)
*H04L 51/04* (2022.01)
(Continued)

(52) U.S. Cl.
CPC ............ *H04L 51/04* (2013.01); *G06F 3/0482* (2013.01); *G06F 16/958* (2019.01); *H04L 51/02* (2013.01)

(58) Field of Classification Search
CPC .. G06F 3/048; G06F 3/04883; G06F 3/04817; G06F 3/0482; G06F 3/04842;
(Continued)

(56) References Cited

U.S. PATENT DOCUMENTS 5,754,939 A 5/1998 Herz et al.
5,880,731 A 3/1999 Liles et al.
(Continued)

FOREIGN PATENT DOCUMENTS

CA 2887596 7/2015
CN 109863532 A 6/2019
(Continued)

OTHER PUBLICATIONS

Castelluccia, Claude, "EphPub: Toward robust Ephemeral Publishing", 19th IEEE International Conference on Network Protocols (ICNP), (Oct. 17, 2011), 18 pgs.
(Continued)

*Primary Examiner* — Di Xiao
(74) *Attorney, Agent, or Firm* — Schwegman Lundberg & Woessner, P.A.

(57) ABSTRACT

A content suggestion system to generate and cause display of a set of chat suggestions based on messages received at a client device. The content suggestions system is configured to display messages that include message content at a client device, and identify content selected by a user of the client device to be included in a response to the messages received at the client device. The content suggestion system tracks and stores a number of times in which a particular pair of content appear in succession in a chat context, and calculates a ranking of the content among a set of available content. When subsequent messages that include the content of the content pair are displayed at the client device, the content suggestion system retrieves and presents a set of content as suggestions, based on the corresponding ranks.

14 Claims, 11 Drawing Sheets

(51) Int. Cl.
*H04L 51/02* (2022.01)
*G06F 16/958* (2019.01)

(58) Field of Classification Search
CPC .. G06F 3/0484; G06F 3/0488; G06F 3/04845;
G06F 3/1454; G06F 3/167; G06F 9/451;
G06F 17/276; G06F 17/24; G06F
17/2795; G06F 3/0237; G06F 3/04886;
G06F 11/008; G06F 11/0736; G06F
11/0748; G06F 11/0793; G06F 16/9535;
G06F 16/9558; G06F 19/321; G06F
11/3006; G06F 11/3041; G06F 11/3058;
G06F 11/32; G06F 16/2365; G06F
16/285; G06F 16/3329; G06F 16/9024;
G06F 16/90328; G06F 16/951; G06F
8/61; G06F 9/44505; H04L 51/02
See application file for complete search history.

(56) References Cited

U.S. PATENT DOCUMENTS

| | | |
|---|---|---|
| 6,023,270 A | 2/2000 | Brush, II et al. |
| 6,038,295 A | 3/2000 | Mattes |
| 6,158,044 A | 12/2000 | Tibbetts |
| 6,167,435 A | 12/2000 | Druckenmiller et al. |
| 6,205,432 B1 | 3/2001 | Gabbard et al. |
| 6,223,165 B1 | 4/2001 | Lauffer |
| 6,310,694 B1 | 10/2001 | Okimoto et al. |
| 6,484,196 B1 | 11/2002 | Maurille |
| 6,487,586 B2 | 11/2002 | Ogilvie et al. |
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,772,195 B1 | 8/2004 | Hatlelid et al. |
| 6,842,779 B1 | 1/2005 | Nishizawa |
| 6,980,909 B2 | 12/2005 | Root et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,342,587 B2 | 3/2008 | Danzig et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,468,729 B1 | 12/2008 | Levinson |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,636,755 B2 | 12/2009 | Blattner et al. |
| 7,639,251 B2 | 12/2009 | Gu et al. |
| 7,703,140 B2 | 4/2010 | Nath et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,912,896 B2 | 3/2011 | Wolovitz et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,131,597 B2 | 3/2012 | Hudetz |
| 8,146,005 B2 | 3/2012 | Jones et al. |
| 8,151,191 B2 | 4/2012 | Nicol |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,570,907 B2 | 10/2013 | Garcia, Jr. et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,718,333 B2 | 5/2014 | Wolf et al. |
| 8,724,622 B2 | 5/2014 | Rojas |
| 8,745,132 B2 | 6/2014 | Obradovich |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,874,677 B2 | 10/2014 | Rosen et al. |
| 8,890,926 B2 | 11/2014 | Tandon et al. |
| 8,892,999 B2 | 11/2014 | Nims et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,924,250 B2 | 12/2014 | Bates et al. |
| 8,963,926 B2 | 2/2015 | Brown et al. |
| 8,989,786 B2 | 3/2015 | Feghali |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,086,776 B2 | 7/2015 | Ye et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,241,184 B2 | 1/2016 | Weerasinghe |
| 9,256,860 B2 | 2/2016 | Herger et al. |
| 9,264,463 B2 | 2/2016 | Rubinstein et al. |
| 9,276,886 B1 | 3/2016 | Samaranayake |
| 9,294,425 B1 | 3/2016 | Son |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,385,983 B1 | 7/2016 | Sehn |
| 9,396,354 B1 | 7/2016 | Murphy et al. |
| 9,402,057 B2 | 7/2016 | Kaytaz et al. |
| 9,407,712 B1 | 8/2016 | Sehn |
| 9,407,816 B1 | 8/2016 | Sehn |
| 9,412,192 B2 | 8/2016 | Mandel et al. |
| 9,430,783 B1 | 8/2016 | Sehn |
| 9,443,227 B2 | 9/2016 | Evans et al. |
| 9,460,541 B2 | 10/2016 | Li et al. |
| 9,482,882 B1 | 11/2016 | Hanover et al. |

(56) References Cited

U.S. PATENT DOCUMENTS

| | | | |
|---|---|---|---|
| 9,482,883 | B1 | 11/2016 | Meisenholder |
| 9,489,661 | B2 | 11/2016 | Evans et al. |
| 9,489,760 | B2 | 11/2016 | Li et al. |
| 9,491,134 | B2 | 11/2016 | Rosen et al. |
| 9,503,845 | B2 | 11/2016 | Vincent |
| 9,508,197 | B2 | 11/2016 | Quinn et al. |
| 9,532,171 | B2 | 12/2016 | Allen et al. |
| 9,537,811 | B2 | 1/2017 | Allen et al. |
| 9,544,257 | B2 | 1/2017 | Ogundokun et al. |
| 9,560,006 | B2 | 1/2017 | Prado et al. |
| 9,576,400 | B2 | 2/2017 | Van Os et al. |
| 9,589,357 | B2 | 3/2017 | Li et al. |
| 9,592,449 | B2 | 3/2017 | Barbalet et al. |
| 9,628,950 | B1 | 4/2017 | Noeth et al. |
| 9,648,376 | B2 | 5/2017 | Chang et al. |
| 9,652,896 | B1 | 5/2017 | Jurgenson et al. |
| 9,659,244 | B2 | 5/2017 | Anderton et al. |
| 9,693,191 | B2 | 6/2017 | Sehn |
| 9,697,635 | B2 | 7/2017 | Quinn et al. |
| 9,705,831 | B2 | 7/2017 | Spiegel |
| 9,706,040 | B2 | 7/2017 | Kadirvel et al. |
| 9,742,713 | B2 | 8/2017 | Spiegel et al. |
| 9,744,466 | B2 | 8/2017 | Fujioka |
| 9,746,990 | B2 | 8/2017 | Anderson et al. |
| 9,749,270 | B2 | 8/2017 | Collet et al. |
| 9,785,796 | B1 | 10/2017 | Murphy et al. |
| 9,792,714 | B2 | 10/2017 | Li et al. |
| 9,825,898 | B2 | 11/2017 | Sehn |
| 9,839,844 | B2 | 12/2017 | Dunstan et al. |
| 9,854,219 | B2 | 12/2017 | Sehn |
| 9,883,838 | B2 | 2/2018 | Kaleal, III et al. |
| 9,898,849 | B2 | 2/2018 | Du et al. |
| 9,911,073 | B1 | 3/2018 | Spiegel et al. |
| 9,936,165 | B2 | 4/2018 | Li et al. |
| 9,959,037 | B2 | 5/2018 | Chaudhri et al. |
| 9,961,520 | B2 | 5/2018 | Brooks et al. |
| 9,980,100 | B1 | 5/2018 | Charlton et al. |
| 9,990,373 | B2 | 6/2018 | Fortkort |
| 10,039,988 | B2 | 8/2018 | Lobb et al. |
| 10,097,492 | B2 | 10/2018 | Tsuda et al. |
| 10,116,598 | B2 | 10/2018 | Tucker et al. |
| 10,155,168 | B2 | 12/2018 | Blackstock et al. |
| 10,242,477 | B1 | 3/2019 | Charlton et al. |
| 10,242,503 | B2 | 3/2019 | McPhee et al. |
| 10,262,250 | B1 | 4/2019 | Spiegel et al. |
| 10,362,219 | B2 | 7/2019 | Wilson et al. |
| 10,475,225 | B2 | 11/2019 | Park et al. |
| 10,504,266 | B2 | 12/2019 | Blattner et al. |
| 10,573,048 | B2 | 2/2020 | Ni et al. |
| 10,657,701 | B2 | 5/2020 | Osman et al. |
| 2002/0047868 | A1 | 4/2002 | Miyazawa |
| 2002/0067362 | A1 | 6/2002 | Agostino Nocera et al. |
| 2002/0144154 | A1 | 10/2002 | Tomkow |
| 2002/0169644 | A1 | 11/2002 | Greene |
| 2003/0052925 | A1 | 3/2003 | Daimon et al. |
| 2003/0126215 | A1 | 7/2003 | Udell |
| 2003/0217106 | A1 | 11/2003 | Adar et al. |
| 2004/0203959 | A1 | 10/2004 | Coombes |
| 2005/0097176 | A1 | 5/2005 | Schatz et al. |
| 2005/0162419 | A1 | 7/2005 | Kim et al. |
| 2005/0020661 | A1 | 9/2005 | Cordelli |
| 2005/0198128 | A1 | 9/2005 | Anderson |
| 2005/0223066 | A1 | 10/2005 | Buchheit et al. |
| 2006/0242239 | A1 | 10/2006 | Morishima et al. |
| 2006/0270419 | A1 | 11/2006 | Crowley et al. |
| 2006/0294465 | A1 | 12/2006 | Ronen et al. |
| 2007/0038715 | A1 | 2/2007 | Collins et al. |
| 2007/0064899 | A1 | 3/2007 | Boss et al. |
| 2007/0073823 | A1 | 3/2007 | Cohen et al. |
| 2007/0113181 | A1 | 5/2007 | Blattner et al. |
| 2007/0168863 | A1 | 7/2007 | Blattner et al. |
| 2007/0176921 | A1 | 8/2007 | Iwasaki et al. |
| 2007/0214216 | A1 | 9/2007 | Carrer et al. |
| 2007/0233801 | A1 | 10/2007 | Eren et al. |
| 2008/0055269 | A1 | 3/2008 | Lemay et al. |
| 2008/0120409 | A1 | 5/2008 | Sun et al. |
| 2008/0158222 | A1 | 7/2008 | Li et al. |
| 2008/0207176 | A1 | 8/2008 | Brackbill et al. |
| 2008/0270938 | A1 | 10/2008 | Carlson |
| 2008/0306826 | A1 | 12/2008 | Kramer et al. |
| 2008/0313346 | A1 | 12/2008 | Kujawa et al. |
| 2009/0016617 | A1 | 1/2009 | Bregman-Amitai et al. |
| 2009/0042588 | A1 | 2/2009 | Lottin et al. |
| 2009/0055484 | A1 | 2/2009 | Vuong et al. |
| 2009/0070688 | A1 | 3/2009 | Gyorfi et al. |
| 2009/0099925 | A1 | 4/2009 | Mehta et al. |
| 2009/0106672 | A1 | 4/2009 | Burstrom |
| 2009/0132453 | A1 | 5/2009 | Hangartner et al. |
| 2009/0158170 | A1 | 6/2009 | Narayanan et al. |
| 2009/0177976 | A1 | 7/2009 | Bokor et al. |
| 2009/0202114 | A1 | 8/2009 | Morin et al. |
| 2009/0265604 | A1 | 10/2009 | Howard et al. |
| 2009/0300525 | A1 | 12/2009 | Jolliff et al. |
| 2009/0303984 | A1 | 12/2009 | Clark et al. |
| 2010/0011422 | A1 | 1/2010 | Mason et al. |
| 2010/0023885 | A1 | 1/2010 | Reville et al. |
| 2010/0082427 | A1 | 4/2010 | Burgener et al. |
| 2010/0115426 | A1 | 5/2010 | Liu et al. |
| 2010/0131880 | A1 | 5/2010 | Lee et al. |
| 2010/0162149 | A1 | 6/2010 | Sheleheda et al. |
| 2010/0185665 | A1 | 7/2010 | Horn et al. |
| 2010/0203968 | A1 | 8/2010 | Gill et al. |
| 2010/0227682 | A1 | 9/2010 | Reville et al. |
| 2010/0306669 | A1 | 12/2010 | Della Pasqua |
| 2011/0093780 | A1 | 4/2011 | Dunn |
| 2011/0099507 | A1 | 4/2011 | Nesladek et al. |
| 2011/0115798 | A1 | 5/2011 | Nayar et al. |
| 2011/0145564 | A1 | 6/2011 | Moshir et al. |
| 2011/0148864 | A1 | 6/2011 | Lee et al. |
| 2011/0202598 | A1 | 8/2011 | Evans et al. |
| 2011/0213845 | A1 | 9/2011 | Logan et al. |
| 2011/0239136 | A1 | 9/2011 | Goldman et al. |
| 2011/0286586 | A1 | 11/2011 | Saylor et al. |
| 2011/0320373 | A1 | 12/2011 | Lee et al. |
| 2012/0028659 | A1 | 2/2012 | Whitney et al. |
| 2012/0113106 | A1 | 5/2012 | Choi et al. |
| 2012/0124458 | A1 | 5/2012 | Cruzada |
| 2012/0130717 | A1 | 5/2012 | Xu et al. |
| 2012/0184248 | A1 | 7/2012 | Speede |
| 2012/0209921 | A1 | 8/2012 | Adafin et al. |
| 2012/0209924 | A1 | 8/2012 | Evans et al. |
| 2012/0254325 | A1 | 10/2012 | Majeti et al. |
| 2012/0278692 | A1 | 11/2012 | Shi |
| 2012/0304080 | A1 | 11/2012 | Wormald et al. |
| 2013/0071093 | A1 | 3/2013 | Hanks et al. |
| 2013/0103760 | A1 | 4/2013 | Golding et al. |
| 2013/0194301 | A1 | 8/2013 | Robbins et al. |
| 2013/0201187 | A1 | 8/2013 | Tong et al. |
| 2013/0249948 | A1 | 9/2013 | Reitan |
| 2013/0254689 | A1* | 9/2013 | Clift ................ G06F 3/0482 715/765 |
| 2013/0257877 | A1 | 10/2013 | Davis |
| 2013/0290443 | A1 | 10/2013 | Collins et al. |
| 2014/0032682 | A1 | 1/2014 | Prado et al. |
| 2014/0043329 | A1 | 2/2014 | Wang et al. |
| 2014/0055554 | A1 | 2/2014 | Du et al. |
| 2014/0122787 | A1 | 5/2014 | Shalvi et al. |
| 2014/0125678 | A1 | 5/2014 | Wang et al. |
| 2014/0129343 | A1 | 5/2014 | Finster et al. |
| 2014/0201527 | A1 | 7/2014 | Krivorot |
| 2014/0282096 | A1 | 9/2014 | Rubinstein et al. |
| 2014/0297267 | A1* | 10/2014 | Spencer ............. G06F 17/276 704/9 |
| 2014/0325383 | A1 | 10/2014 | Brown et al. |
| 2014/0359024 | A1 | 12/2014 | Spiegel |
| 2014/0359032 | A1 | 12/2014 | Spiegel et al. |
| 2015/0199082 | A1 | 7/2015 | Scholler et al. |
| 2015/0206349 | A1 | 7/2015 | Rosenthal et al. |
| 2015/0227602 | A1 | 8/2015 | Ramu et al. |
| 2016/0050169 | A1* | 2/2016 | Ben Atar ......... G06F 3/04886 709/206 |
| 2016/0085773 | A1 | 3/2016 | Chang et al. |
| 2016/0085863 | A1 | 3/2016 | Allen et al. |
| 2016/0086670 | A1 | 3/2016 | Gross et al. |

(56) References Cited

U.S. PATENT DOCUMENTS

| | | | |
|---|---|---|---|
| 2016/0099901 A1 | 4/2016 | Allen et al. | |
| 2016/0134840 A1 | 5/2016 | Mcculloch | |
| 2016/0180887 A1 | 6/2016 | Sehn | |
| 2016/0234149 A1 | 8/2016 | Tsuda et al. | |
| 2016/0277419 A1 | 9/2016 | Allen et al. | |
| 2016/0321708 A1 | 11/2016 | Sehn | |
| 2016/0359771 A1* | 12/2016 | Sridhar | H04M 1/72552 |
| 2016/0359957 A1 | 12/2016 | Laliberte | |
| 2016/0359987 A1 | 12/2016 | Laliberte | |
| 2017/0075873 A1* | 3/2017 | Shetty | G06F 3/0481 |
| 2017/0080346 A1 | 3/2017 | Abbas | |
| 2017/0087473 A1 | 3/2017 | Siegel et al. | |
| 2017/0113140 A1 | 4/2017 | Blackstock et al. | |
| 2017/0118145 A1 | 4/2017 | Aittoniemi et al. | |
| 2017/0161382 A1 | 6/2017 | Ouimet et al. | |
| 2017/0199855 A1 | 7/2017 | Fishbeck | |
| 2017/0222961 A1* | 8/2017 | Beach | H04L 51/16 |
| 2017/0235848 A1 | 8/2017 | Van et al. | |
| 2017/0263029 A1 | 9/2017 | Yan et al. | |
| 2017/0287006 A1 | 10/2017 | Azmoodeh et al. | |
| 2017/0295250 A1 | 10/2017 | Samaranayake et al. | |
| 2017/0310934 A1 | 10/2017 | Du et al. | |
| 2017/0312634 A1 | 11/2017 | Ledoux et al. | |
| 2017/0336958 A1 | 11/2017 | Chaudhri et al. | |
| 2017/0374003 A1 | 12/2017 | Allen et al. | |
| 2017/0374508 A1 | 12/2017 | Davis et al. | |
| 2018/0025219 A1* | 1/2018 | Baldwin | H04L 51/10 382/118 |
| 2018/0047200 A1 | 2/2018 | O'hara et al. | |
| 2018/0054405 A1* | 2/2018 | Ritch | H04L 51/10 |
| 2018/0061407 A1 | 3/2018 | Qin et al. | |
| 2018/0113587 A1 | 4/2018 | Allen et al. | |
| 2018/0115503 A1 | 4/2018 | Baldwin et al. | |
| 2018/0277004 A1* | 9/2018 | Taylor | G09B 7/06 |
| 2018/0315076 A1 | 11/2018 | Andreou | |
| 2018/0315133 A1 | 11/2018 | Brody et al. | |
| 2018/0315134 A1 | 11/2018 | Amitay et al. | |
| 2018/0359199 A1* | 12/2018 | Nguyen | G06F 16/3329 |
| 2018/0367484 A1* | 12/2018 | Rodriguez | G06Q 10/101 |
| 2019/0001223 A1 | 1/2019 | Blackstock et al. | |
| 2019/0057616 A1 | 2/2019 | Cohen et al. | |
| 2019/0188920 A1 | 6/2019 | Mcphee et al. | |
| 2019/0190872 A1* | 6/2019 | Peiris | H04W 4/21 |

FOREIGN PATENT DOCUMENTS

| | | |
|---|---|---|
| CN | 110168478 A | 8/2019 |
| CN | 111954892 A | 11/2020 |
| EP | 2184092 A2 | 5/2010 |
| JP | 2001230801 A | 8/2001 |
| JP | 5497931 B2 | 3/2014 |
| KR | 101445263 B1 | 9/2014 |
| KR | 20160031619 A | 3/2016 |
| KR | 20160104421 A | 9/2016 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2008103002 A1 | 8/2008 |
| WO | 2012000107 | 1/2012 |
| WO | WO-2012139276 A1 | 10/2012 |
| WO | 2013008251 | 1/2013 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | 2014194262 | 12/2014 |
| WO | WO-2014194439 A1 | 12/2014 |
| WO | 2015192026 | 12/2015 |
| WO | 2016054562 | 4/2016 |
| WO | 2016065131 | 4/2016 |
| WO | WO-2016090605 A1 | 6/2016 |
| WO | 2016/112299 | 7/2016 |
| WO | 2016179166 | 11/2016 |
| WO | 2016179235 | 11/2016 |
| WO | 2017176739 | 10/2017 |
| WO | 2017176992 | 10/2017 |
| WO | 2018005644 | 1/2018 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | WO-2019199977 A1 | 10/2019 |

OTHER PUBLICATIONS

Fajman, "An Extensible Message Format for Message Disposition Notifications", Request for Comments: 2298, National Institutes of Health, (Mar. 1998), 28 pgs.

Leyden, John, "This SMS will self-destruct in 40 seconds", URL: http: www.theregister.co.uk Dec. 12, 2005 stealthtext, (Dec. 12, 2005), 1 pg.

Melanson, Mike, "This text message will self destruct in 60 seconds", URL: http: readwrite.com Feb. 11, 2011 this_text_message_will_self_destruct_in_60_seconds, (Feb. 18, 2015), 4 pgs.

Sawers, Paul, "Snapchat for iOS Lets You Send Photos to Friends and Set How long They're Visible For", URL: https: thenextweb.com apps May 7, 2012 snapchat-for-ios-lets-you-send-photos-to-friends-and-set-how-long-theyre-visible-for , (May 7, 2012), 5 pgs.

Shein, Esther, "Ephemeral Data", Communications of the ACM, vol. 56, No. 9, (Sep. 2013), 20-22.

Vaas, Lisa, "StealthText, Should You Choose to Accept It", URL: http: www.eweek.com print c a MessagingandCollaboration StealthTextShouldYouChoosetoAcceptIt, (Dec. 13, 2005), 2 pgs.

"International Application Serial No. PCT/US2019/026795, International Search Report dated Jul. 30, 2019", 4 pgs.

"International Application Serial No. PCT/US2019/026795, Written Opinion dated Jul. 30, 19", 5 pgs.

"International Application Serial No. PCT/US2019/026795, International Preliminary Report on Patentability dated Oct. 22, 2020", 7 pgs.

* cited by examiner

500

```
┌─────────────────────────────────────────────────────────────┐
│ CAUSING DISPLAY OF A SECOND MESSAGE WITHIN THE CHAT INTERFACE│
│   AT THE CLIENT DEVICE, THE SECOND MESSAGE INCLUDING THE FIRST│
│                          CONTENT                             │
│                           502                                │
└─────────────────────────────────────────────────────────────┘
                              │
                              ▼
┌─────────────────────────────────────────────────────────────┐
│   GENERATING A PRESENTATION OF THE SET OF CONTENT, THE      │
│ PRESENTATION INCLUDING A DISPLAY OF THE SECOND CONTENT AT A │
│ POSITION AMONG THE SET OF CONTENT, THE POSITION BASED ON THE│
│                       USAGE METRIC                          │
│                           504                               │
└─────────────────────────────────────────────────────────────┘
                              │
                              ▼
┌─────────────────────────────────────────────────────────────┐
│ CAUSING DISPLAY OF THE PRESENTATION WITHIN THE CHAT INTERFACE│
│                    AT THE CLIENT DEVICE                     │
│                           506                               │
└─────────────────────────────────────────────────────────────┘
```

FIG. 5

CONTENT SUGGESTION SYSTEM

TECHNICAL FIELD

Embodiments of the present disclosure relate generally to mobile computing technology and, more particularly, but not by way of limitation, to systems for managing content of chat sessions between users.

BACKGROUND

Mobile devices (such as smart phones, personal digital assistants, computer tablets, smart watches, and so on) are ubiquitous. Mobile devices provide advanced computing capabilities and services to users, such as voice communications, text and other messaging communications, video and other multimedia communications, streaming services, and so on. Often, users send and receive data (e.g., messages), and otherwise communicate with one another via mobile devices.

Existing text-based communication applications (e.g., text messaging, instant messaging, chats, email, and so on) provide users with user selectable options for supplementing input text with pictorial elements, such as emojis and other ideograms, pictograms, images, GIFs, animations, videos, and other multimedia content. Users may search for and select various elements into their message to provide additional context to text-based content.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 is a flowchart illustrating a method for presenting chat suggestions, according to certain example embodiments.

DETAILED DESCRIPTION

Figure 1:
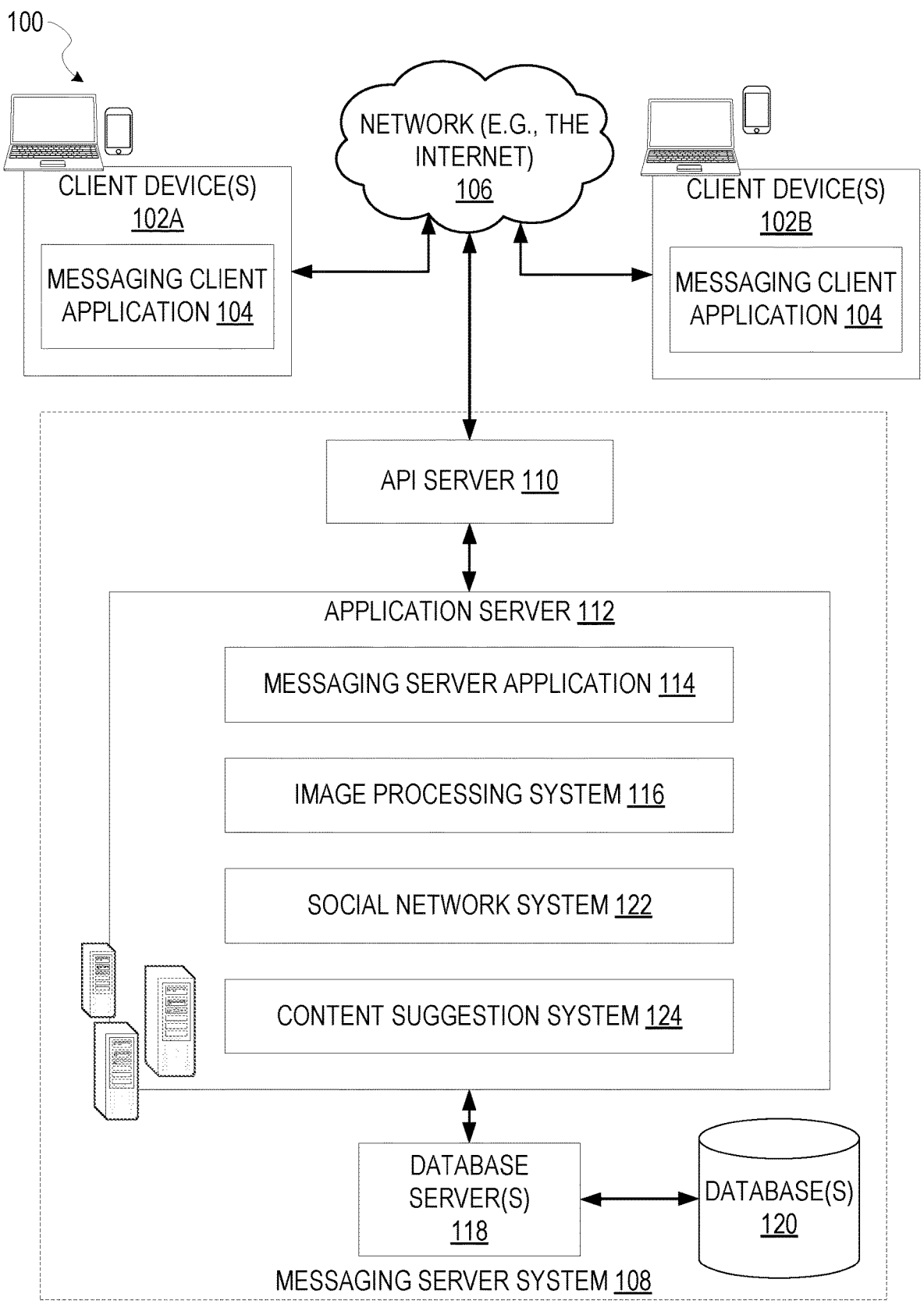
FIG. 1 is a block diagram showing an example messaging system for exchanging data (e.g., messages and associated content) over a network in accordance with some embodiments, wherein the messaging system includes a content suggestion system.

Conventional chat systems often provide certain "chat suggestions" based on explicit (or implicit) inputs received from a user, wherein the chat suggestions typically comprise a subsequent text element (e.g., a word, a letter, a punctuation, etc.). These conventional chat systems are able to (at best) provide a suggestion based on an input received at the client device (e.g., the user of the client device begins to draft a response), or based on an existing dictionary or lexicon of common words or phrases. More recently, chat systems have been developed which enable users to communicate with one another through unconventional message content that do not fit within the existing chat suggestion frameworks, due in part to the abstract nature of the content and a constantly changing contextual meaning of the content itself.

For example, some platforms enable individuals to communicate with one another by generating and sharing content such as pictograms and ideograms through a chat interface, wherein a meaning or context of the pictogram or ideogram is not immediately obvious. As a result, generating chat and messaging suggestions that include such content is challenging, and may currently require a significant amount of frontend work to categorize and define content within database. While this may be a sufficient solution in the short term, such databases would require a great deal of maintenance and administrator input in order to add or update the content on a regular basis.

Embodiments described herein relate to a content suggestion system to generate and cause display of a set of chat suggestions based on messages received at a client device. The content suggestions system is configured to display messages that include message content at a client device, and identify content selected by a user of the client device to be included in a response to the messages received at the client device. The content suggestion system tracks and stores a number of times in which a particular pair of content appear in succession in a chat context, and calculates a ranking of the content among a set of available content. When subsequent messages that include the content of the content pair are displayed at the client device, the content suggestion system retrieves and presents a set of content as suggestions, based on the corresponding ranks.

"Message content," as discussed herein may refer to various types of media items that may be included within messages (e.g., text messages, ephemeral message, e-mails, private messages, direct messages, forum posts, etc.) displayed at a client devices. For example, message content may include a text string, pictograms or ideograms (e.g., emoji), images, audio data, video data, as well as personalized avatars (e.g., Bitmoji). Content pairs may comprise any combination of the various types of message content discussed above.

The content suggestion system is configured to cause display of a message that includes message content (e.g., first content) at a client device, and receive a selection of second content from a selection of content options. In response to receiving the selection of the second chat content, the content suggestion system indexes and stores a content pair that comprises the first content and the second content, and increments a usage counter that corresponds to the content pair and indicates a number of times in which the content pair occurred in a message context (i.e., when the second content was used in a response to a message that included the first content). The content suggestion system ranks the second content among a set of content based on the usage metric of the content pair.

In response to receiving a subsequent message that includes the first content at the client device, the content suggestion system retrieves content from a content database, based on rankings corresponding to content pairs that include the first content. For example, the content suggestion system may retrieve the second content from the database, based on the usage metric of the content pair that comprises the first content and the second content. The content suggestion system generates a presentation of the retrieved content, wherein a ranking (i.e., a display order) of the content is based on the corresponding usage metrics. The presentation of the suggested content may be displayed in a portion of a chat interface, for example, proximate to a keyboard element. In some embodiments, the presentation of the suggested content is displayed responsive to receiving a user input to display the keyboard element.

Occasionally, the ranking of the content may result in identical, or nearly identical content to be displayed in a most prominent position among the suggestion content. In some embodiments, the content suggestion system identifies a top ranked portion of the content (e.g., top 6), and randomizes a display order of the top ranked portion of the content in a presentation of the content, in order to provide additional variety and a set of more interesting suggestions to a user.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a content suggestion system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
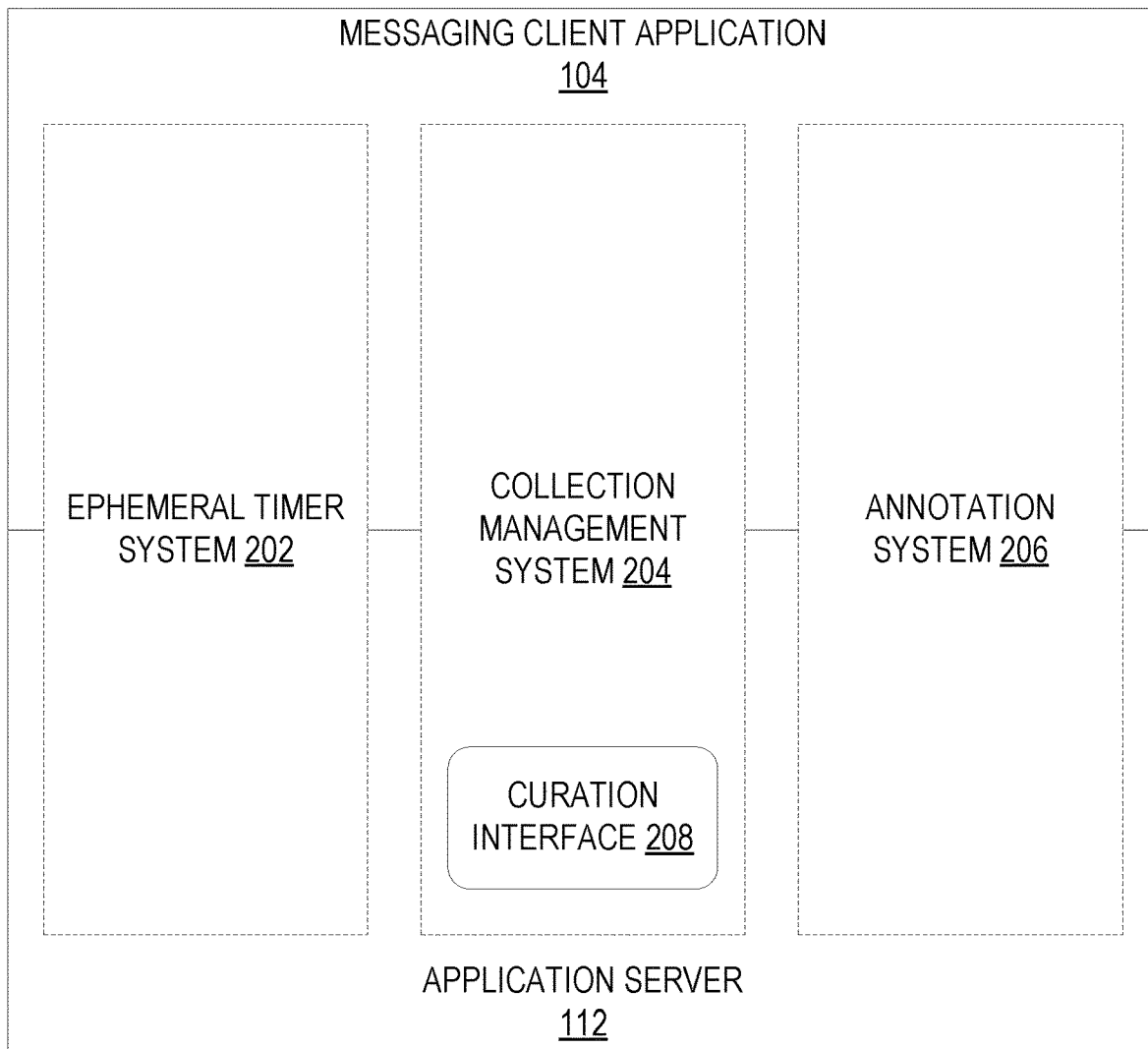
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content, such as personalized avatars (e.g., Bitmoji), permitted by the messaging client application 104 and the messaging server application 114. To this end, the ephemeral timer system 202 incorporates a number of timers that, based on duration and display parameters associated with a message, collection of messages, or graphical element, selectively display and enable access to messages and associated content via the messaging client application 104. Further details regarding the operation of the ephemeral timer system 202 are provided below.

The collection management system 204 is responsible for managing collections of media (e.g., collections of text, image video and audio data, personalized avatars). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects, as well as animated facial models, such as those generated by the content suggestion system 124. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
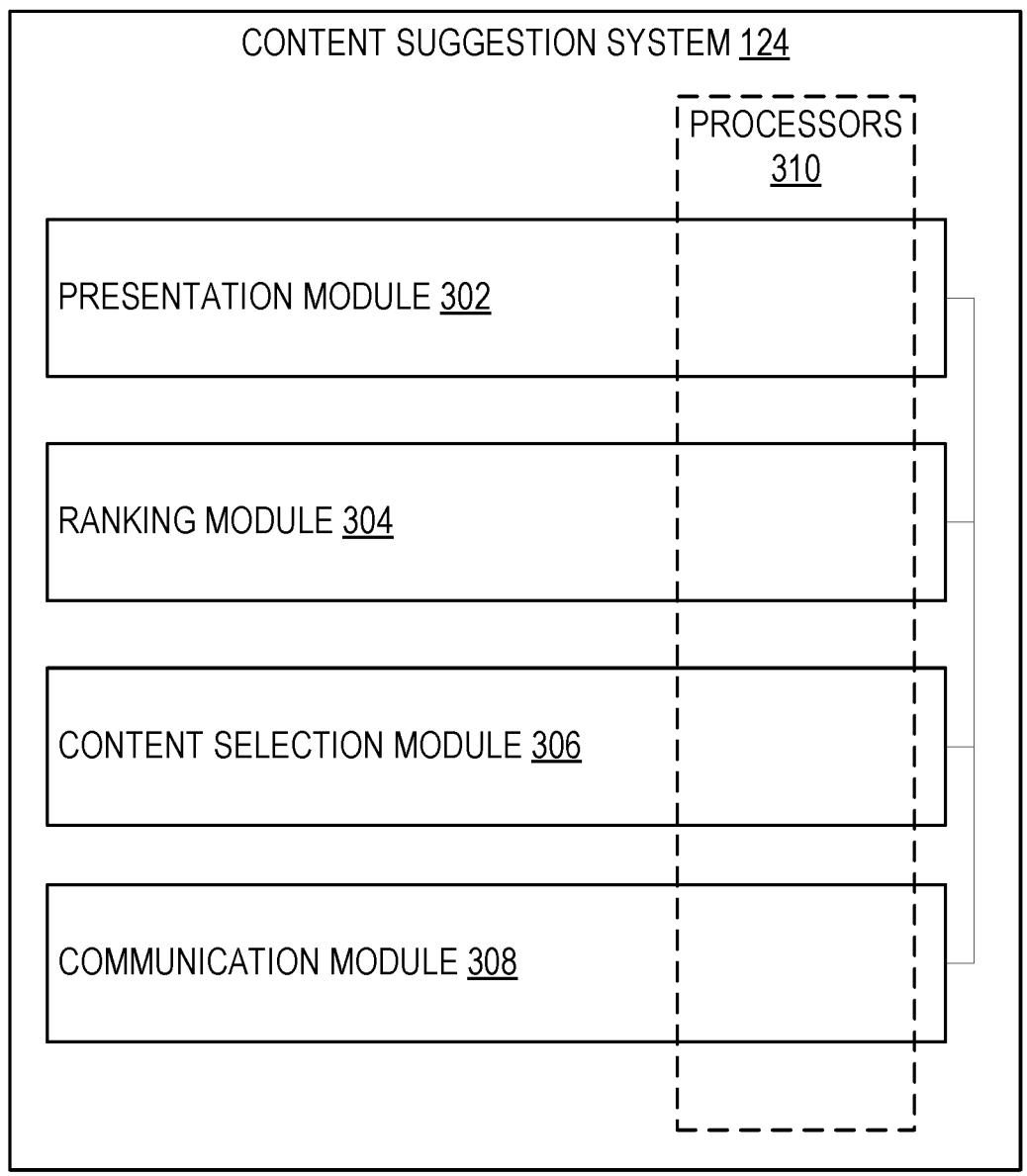
FIG. 3 is a block diagram illustrating various modules of a content suggestion system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a block diagram illustrating components of the content suggestion system 124 that configure the content suggestion system 124 to perform operations that include: causing display of a message within a chat interface at a client device (e.g., client device 102A), wherein the message includes first content, such as a particular personalized avatar (e.g., a Bitmoji); receiving a selection of second content from the client device 102A, wherein the second content may include a different personalized avatar to be assigned to a response to the message; incrementing a usage metric corresponding to a content pair that includes the first content and the second content in response to receiving the selection of the second content from the client device 102A; and ranking the second content among a set of content based on the usage metric of the corresponding content pair, according to some example embodiments. The content suggestion system 124 is shown as including a presentation module 302, a ranking module 304, a content selection module 306, and a communication module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

The presentation module 302 is configured to generate and cause display of presentations of notifications and messages that include content at client device (e.g., the client device 102A and the client device 102B), according to some example embodiments.

The ranking module 304 is configured to calculate usage metrics of corresponding content pair based on user activity that includes a selection of content via a client device, according to some example embodiments.

The content selection module 306 is configured to select and curate a set of content to be presented (e.g., by the presentation module 302) as a chat suggestion, based on the ranking by the ranking module 304, according to some example embodiments.

The communication module 308 is configured to facilitate the exchange of messages and communication between client devices and the network 106, according to certain example embodiments.

Any one or more of the modules described may be implemented using hardware alone (e.g., one or more of the processors 310 of a machine) or a combination of hardware and software. For example, any module described of the content suggestion system 124 may physically include an arrangement of one or more of the processors 310 (e.g., a subset of or among the one or more processors of the machine) configured to perform the operations described herein for that module. As another example, any module of the content suggestion system 124 may include software, hardware, or both, that configure an arrangement of one or more processors 310 (e.g., among the one or more processors of the machine) to perform the operations described herein for that module. Accordingly, different modules of the content suggestion system 124 may include and configure different arrangements of such processors 310 or a single arrangement of such processors 310 at different points in time. Moreover, any two or more modules of the content suggestion system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
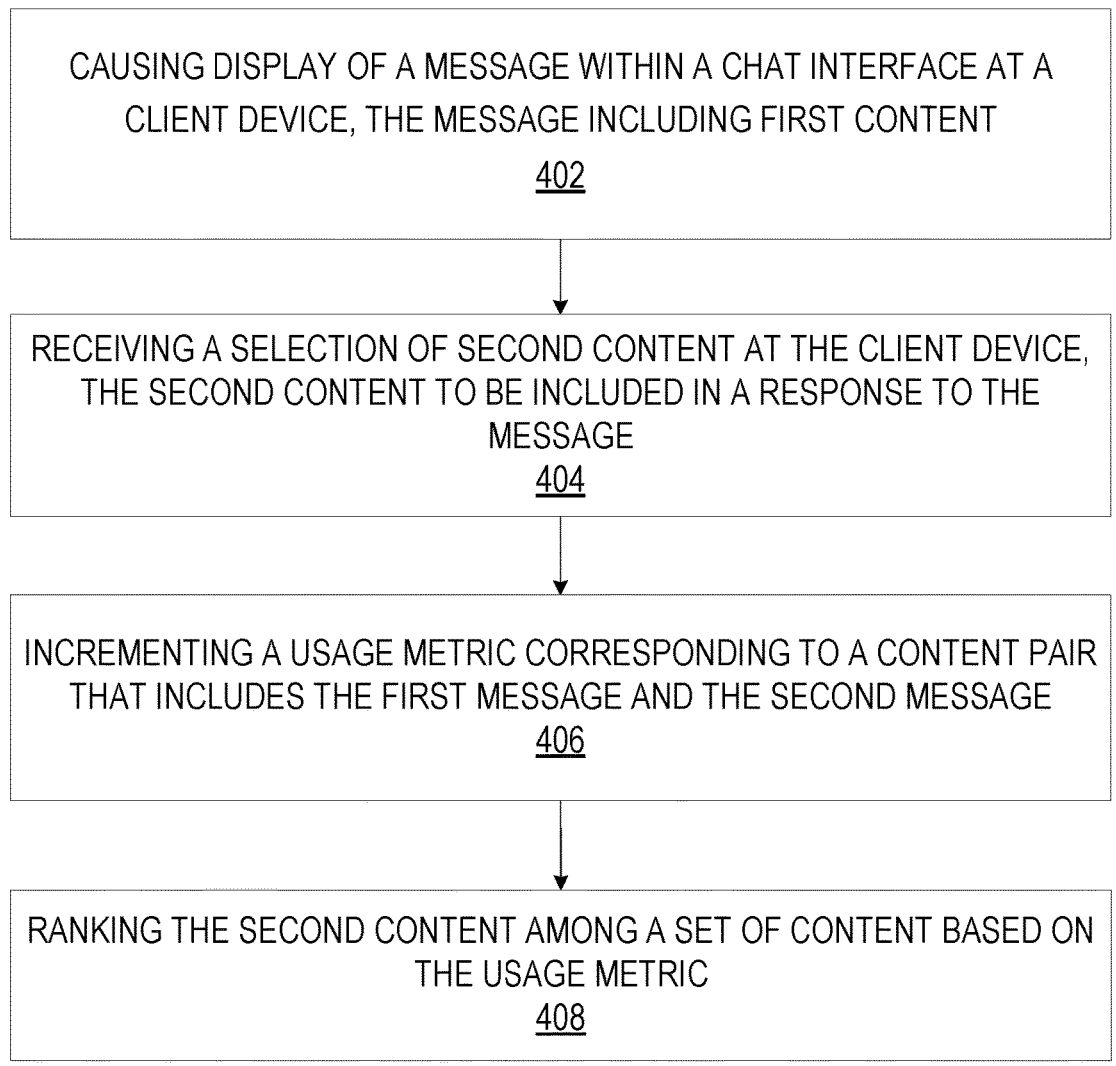
FIG. 4 is a flowchart illustrating a method for ranking chat suggestions, according to certain example embodiments.

FIG. 4 is a flowchart illustrating a method 400 for ranking chat suggestions, according to certain example embodiments. Operations of the method 400 may be performed by the modules described above with respect to FIG. 3. As shown in FIG. 4, the method 400 includes one or more operations 402, 404, 406, and 408.

At operation 402, the presentation module 302 causes display of a message within a chat interface at a client device 102A, wherein the message includes first content. For example, the message may be generated by a client device 102B and transmitted through the network 106 to the client device 102A. The first content of the message includes media content such as personalized avatar, like a Bitmoji.

At operation 404, the communication module 308 receives a selection of second content at the client device 102A, wherein the second content is to be assigned to a response to the message displayed at the client device 102A. For example, a user of the client device 102A may draft a response to the message by selecting or generating a personalized avatar from among a selection of personalized avatars.

At operation 406, the ranking module 304 increments a usage metric associated with a content pair that includes the first content and the second content in response to receiving the selection of the second content from the client device 102A. In some embodiments, the database 120 may comprise a set of content pairs based on selections of content. The ranking module 304 may index and store content pairs within the database 120 based on selections of content made by users. For example, a user of the client device 102A may receive a message that includes first content (e.g., "Bitmoji A") and in drafting a response, the user of the client device 102B selects second content (e.g., "Bitmoji B"). In response to the user selecting the second content, the ranking module 304 indexes and stores a content pair that comprises the first content and the second content, and increments a usage metric that defines a number of times in which "Bitmoji B" is sent in response to "Bitmoji A." At operation 408, the ranking module 304 ranks the content pair among a set of content pairs based on the corresponding usage metric.

FIG. 5 is a flowchart illustrating a method 500 for presenting chat suggestions, according to certain example embodiments. Operations of the method 500 may be performed by the modules described above with respect to FIG. 3. The method 500 may be performed as a part of or subsequent to one or more of the operations of the method 400. As shown in FIG. 5, the method 500 includes one or more operations 502, 504, and 506.

At operation 502, the presentation module 302 generates and causes display of a second message (e.g., a message subsequent to the message displayed in operation 402 of the method 400) within the chat interface of the client device 102A, wherein the second message includes content such as the first content described in the method 400.

In response to displaying the presentation of the second message at the client device 102A, the content selection module 306 generates a presentation of a set of suggested content based on the content displayed within the second message. The presentation of the set of suggested content includes a display of the second content at a position among the set of suggested content, wherein the position of the second content is based on the ranking of the second content. At operation 506, the presentation module 302 causes display of the presentation of the set of suggested content within a portion of the chat interface at the client device 102A.

Figure 6:
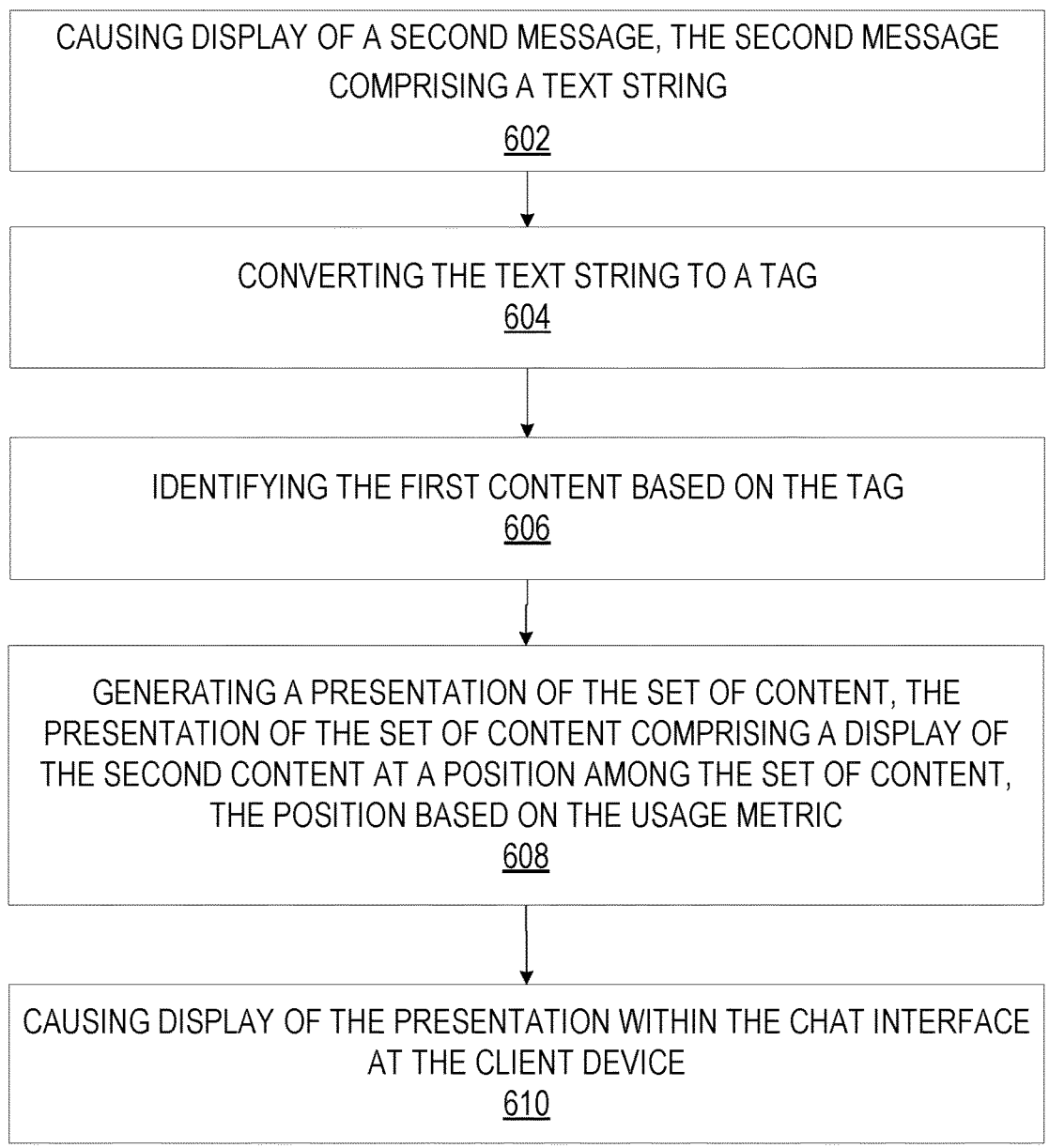
FIG. 6 is a flowchart illustrating a method for presenting chat suggestions, according to certain example embodiments.

FIG. 6 is a flowchart illustrating a method 600 for presenting chat suggestions, according to certain example embodiments. Operations of the method 600 may be performed by the modules described above with respect to FIG. 3. The method 600 may be performed as a part of the method 400 (e.g., a precursor, or subroutine of one of the operations). As shown in FIG. 6, the method 600 includes one or more operations 602, 604, 608, and 610.

At operation 602, the presentation module 302 causes display of a message at the client device 102A, wherein the message includes message content comprising a text string.

At operation 604, in response to displaying the message that comprises the text string at the client device 102A, the content selection module 306 converts the text string to a tag. The tags may be based on the text string themselves, or may be based on a category. For example, the text string of the message may read, "Hello." The content selection module 306 may identify a tag that corresponds with various greetings, wherein the tag is associated with one or more items of media content within the database 120. At operation 606, the content selection module 306 identifies media content (e.g., the first media content) based on the text string and the tag.

At operation 608, in response to identifying the first content based on the presentation of the second message that includes the text string at the client device 102A, the content selection module 306 generates a presentation of a set of suggested content based on the first content displayed within the message. The content selection module 306 retrieves the content pairs associated with the first content, and generates the presentation of the set of suggested content based on the content pairs, wherein a sort order of the set of suggested content is based on the usage metrics corresponding to each of the content pairs.

At operation 610, the presentation module 302 causes display of the presentation of the set of suggested content within a portion of the chat interface at the client device 102A.

Figure 7:
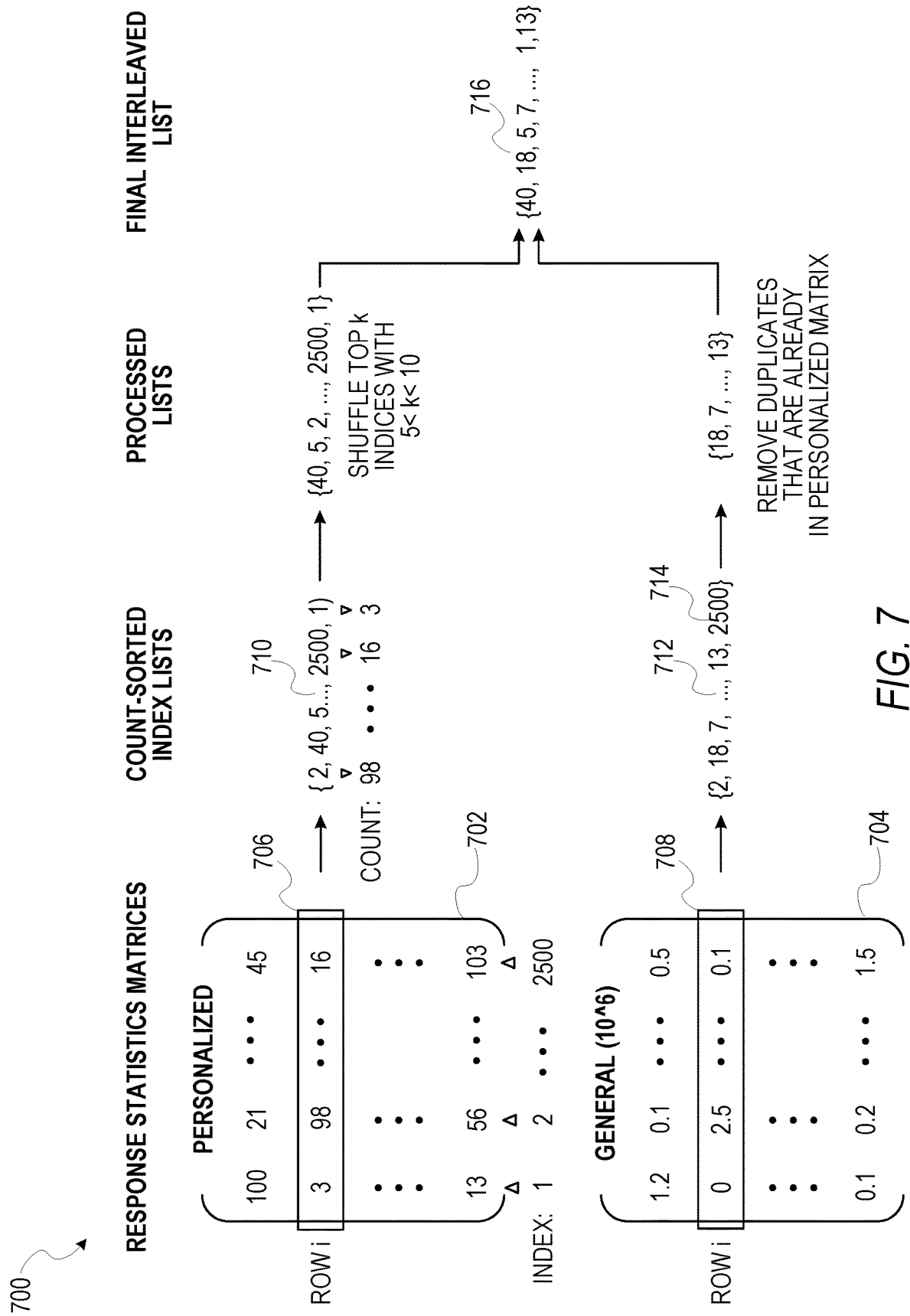
FIG. 7 is a diagram illustrating a method for ranking chat content to be presented as a chat suggestion, according to certain example embodiments.

FIG. 7 is a diagram 700 illustrating a method for ranking chat content to be presented as a chat suggestion, according to certain example embodiments.

As discussed above, with respect to the method 400, the ranking module 304 calculates a usage metric of a content pair and ranks content based on the usage metric. According to some example embodiments, the ranking module 304 may generate one or more matrices (e.g., matrices 702 and 704), wherein each row of a matrix (e.g., row 706 and row 708) comprises usage metrics of content pairs (i.e., a number of times a particular content pair is used). In some embodiments, the ranking module 304 may generate a personalized matrix (e.g., matrix 702), as well as a general matrix (e.g., matrix 704), wherein the personalized matrix corresponds to the specific usage metrics of a particular user of the client device 102A, whereas the general matrix corresponds to the usage metrics of a population of users.

The ranking module 304 identifies the highest ranking content pairs based on the usage metrics, and generates sorted index lists 710 and 712, wherein the sorted index lists comprise a list of content pairs based on content pair identifiers, such as content pair identifier 714 (e.g., "2500"). In some embodiments, the first element (i.e., content pair identifier) in the list corresponds to the highest ranking pair based on usage metrics.

The ranking module removes replicates between the sorted index list 710 and 712, and interleaves the sorted index lists to generate a final interleaved index list 716, that comprises a set of suggested content. The presentation module 302 generates a presentation of the set of suggested content based on the final interleaved index list 716.

Figure 8:
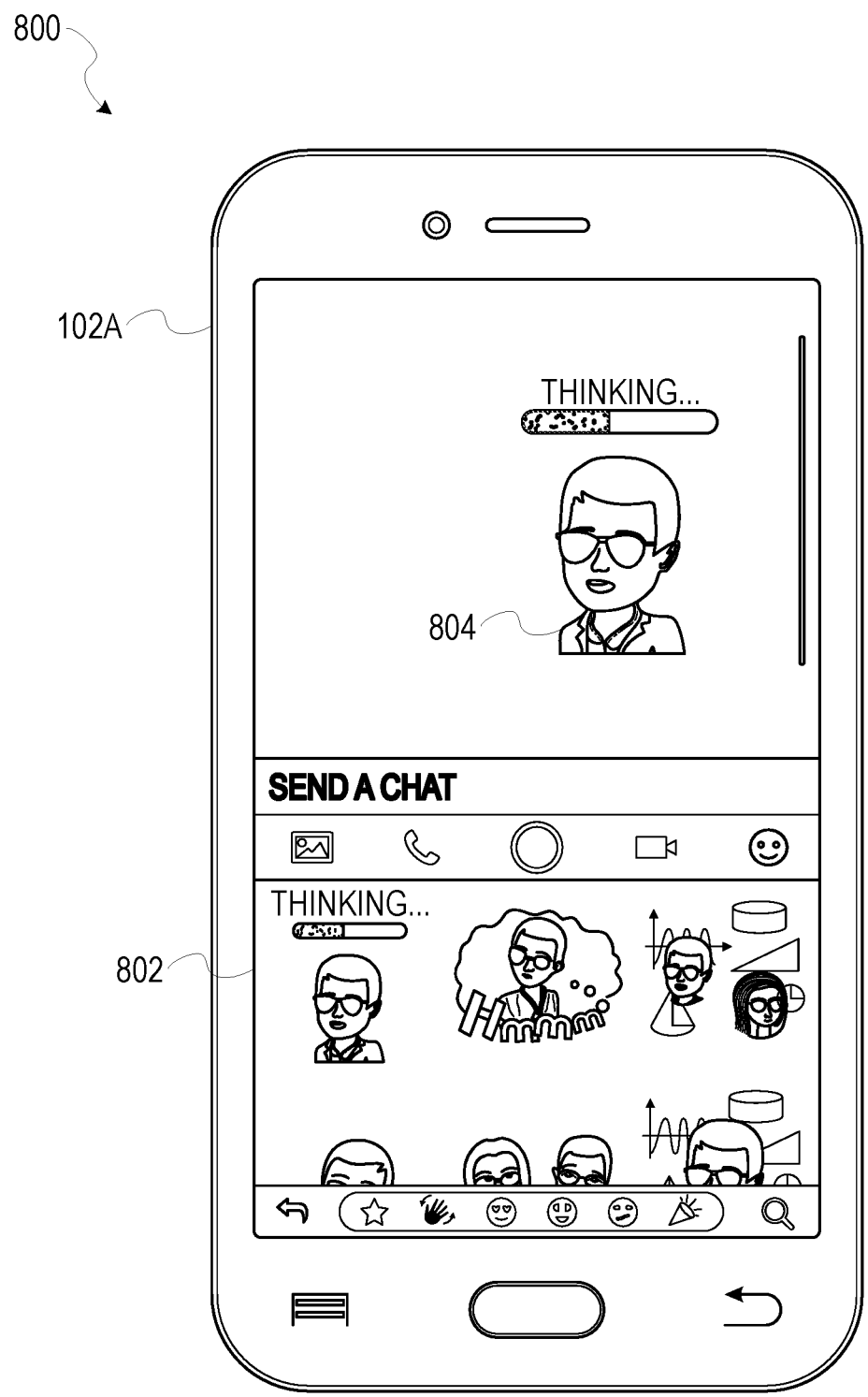
FIG. 8 is an illustration of an interface to display a chat suggestion, according to certain example embodiments.

FIG. 8 is an illustration of an interface 800 to display a set of chat suggestions 802, according to certain example embodiments. As seen in the interface 800 is displayed at a client device 102A, as described in the method 400 of FIG. 4.

The presentation module 302 may display a message within the interface 800, wherein the message comprises first content 804. As seen in FIG. 8, the first content 804 includes a personalized avatar, such as a Bitmoji.

In response to receiving the message that includes the first content 804, the presentation module 302 generates and causes display of the set of suggested content 802, wherein the set of suggested content 802 is based on the first content 804.

Figure 9:
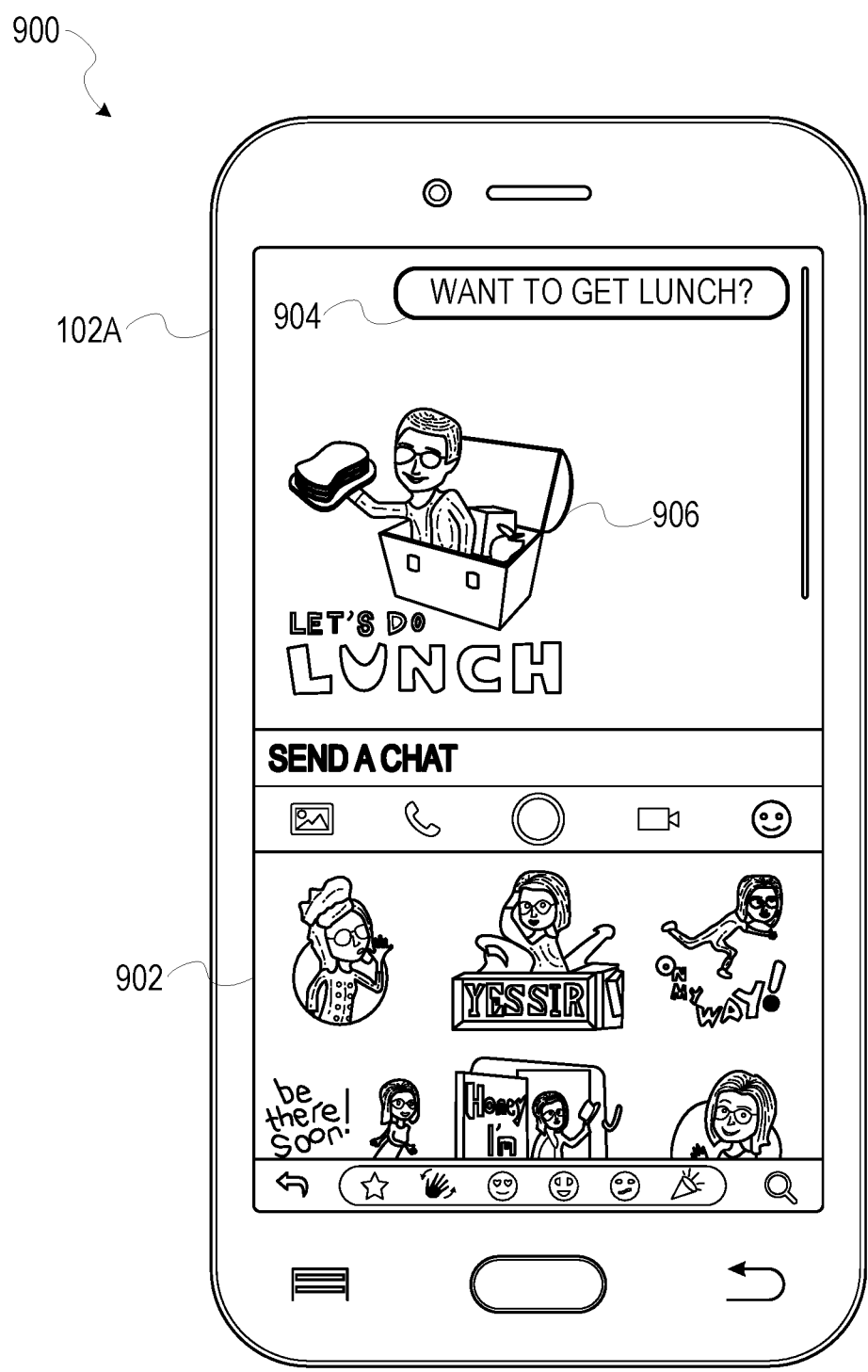
FIG. 9 is an illustration of an interface to display a chat suggestion, according to certain example embodiments.

FIG. 9 is an illustration of an interface 900 to display a set of chat suggestions, according to certain example embodiments. As described in the method 600 of FIG. 6, the presentation module 302 may generate and cause display of a message (e.g., message 904) that comprises first content that may include a text string.

In response to receiving the message 904 that includes a text string, the content selection module 306 converts the text string of the message 904 to a tag, and identifies media content (e.g., the first media content) based on the text string and the tag.

As explained in operation 608 of the method 600, in response to identifying the first content based on the tag from the message 904, the content selection module 306 generates a presentation of a set of suggested content 902 based on the first content associated with the tag.

Software Architecture

Figure 10:
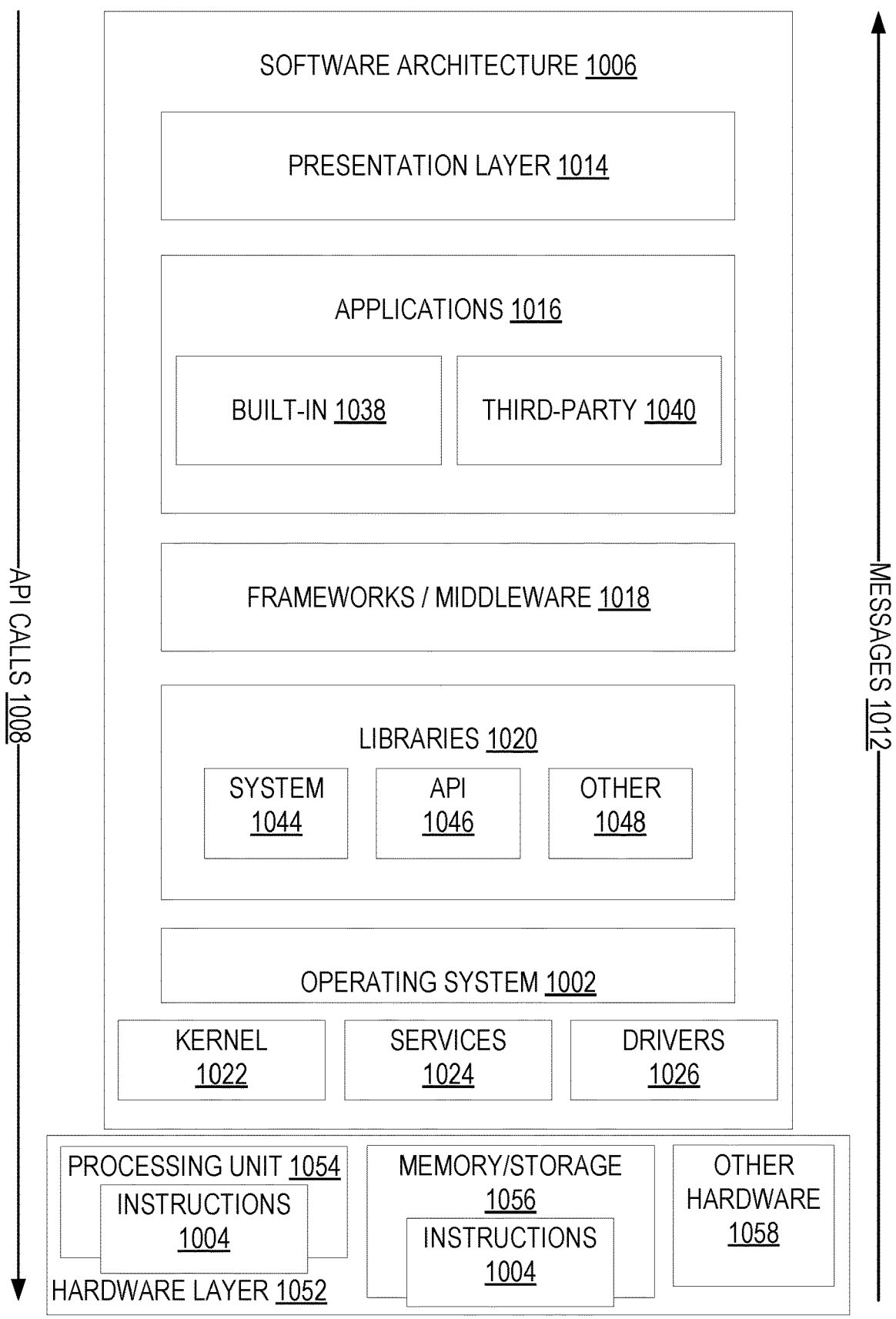
FIG. 10 is a block diagram illustrating a representative software architecture, which may be used in conjunction with various hardware architectures herein described and used to implement various embodiments.

FIG. 10 is a block diagram illustrating an example software architecture 1006, which may be used in conjunction with various hardware architectures herein described. FIG. 10 is a non-limiting example of a software architecture and it will be appreciated that many other architectures may be implemented to facilitate the functionality described herein. The software architecture 1006 may execute on hardware such as machine 1100 of FIG. 11 that includes, among other things, processors 1104, memory 1114, and I/O components 1118. A representative hardware layer 1052 is illustrated and can represent, for example, the machine 1000 of FIG. 10. The representative hardware layer 1052 includes a processing unit 1054 having associated executable instructions 1004. Executable instructions 1004 represent the executable instructions of the software architecture 1006, including implementation of the methods, components and so forth described herein. The hardware layer 1052 also includes memory and/or storage modules memory/storage 1056, which also have executable instructions 1004. The hardware layer 1052 may also comprise other hardware 1058.

In the example architecture of FIG. 10, the software architecture 1006 may be conceptualized as a stack of layers where each layer provides particular functionality. For example, the software architecture 1006 may include layers such as an operating system 1002, libraries 1020, applications 1016 and a presentation layer 1014. Operationally, the applications 1016 and/or other components within the layers may invoke application programming interface (API) API calls 1008 through the software stack and receive a response as in response to the API calls 1008. The layers illustrated are representative in nature and not all software architectures have all layers. For example, some mobile or special purpose operating systems may not provide a frameworks/middleware 1018, while others may provide such a layer. Other software architectures may include additional or different layers.

The operating system 1002 may manage hardware resources and provide common services. The operating system 1002 may include, for example, a kernel 1022, services 1024 and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1020 provide a common infrastructure that is used by the applications 1016 and/or other components and/or layers. The libraries 1020 provide functionality that allows other software components to perform tasks in an easier fashion than to interface directly with the underlying operating system 1002 functionality (e.g., kernel 1022, services 1024 and/or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1018 (also sometimes referred to as middleware) provide a higher-level common infrastructure that may be used by the applications 1016 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1016 and/or other software components/modules, some of which may be specific to a particular operating system 1002 or platform.

The applications 1016 include built-in applications 1038 and/or third-party applications 1040. Examples of representative built-in applications 1038 may include, but are not limited to, a contacts application, a browser application, a book reader application, a location application, a media application, a messaging application, and/or a game application. Third-party applications 1040 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1040 may invoke the API calls 1008 provided by the mobile operating system (such as operating system 1002) to facilitate functionality described herein.

The applications 1016 may use built in operating system functions (e.g., kernel 1022, services 1024 and/or drivers 1026), libraries 1020, and frameworks/middleware 1018 to create user interfaces to interact with users of the system. Alternatively, or additionally, in some systems interactions with a user may occur through a presentation layer, such as presentation layer 1014. In these systems, the application/component "logic" can be separated from the aspects of the application/component that interact with a user.

Figure 11:
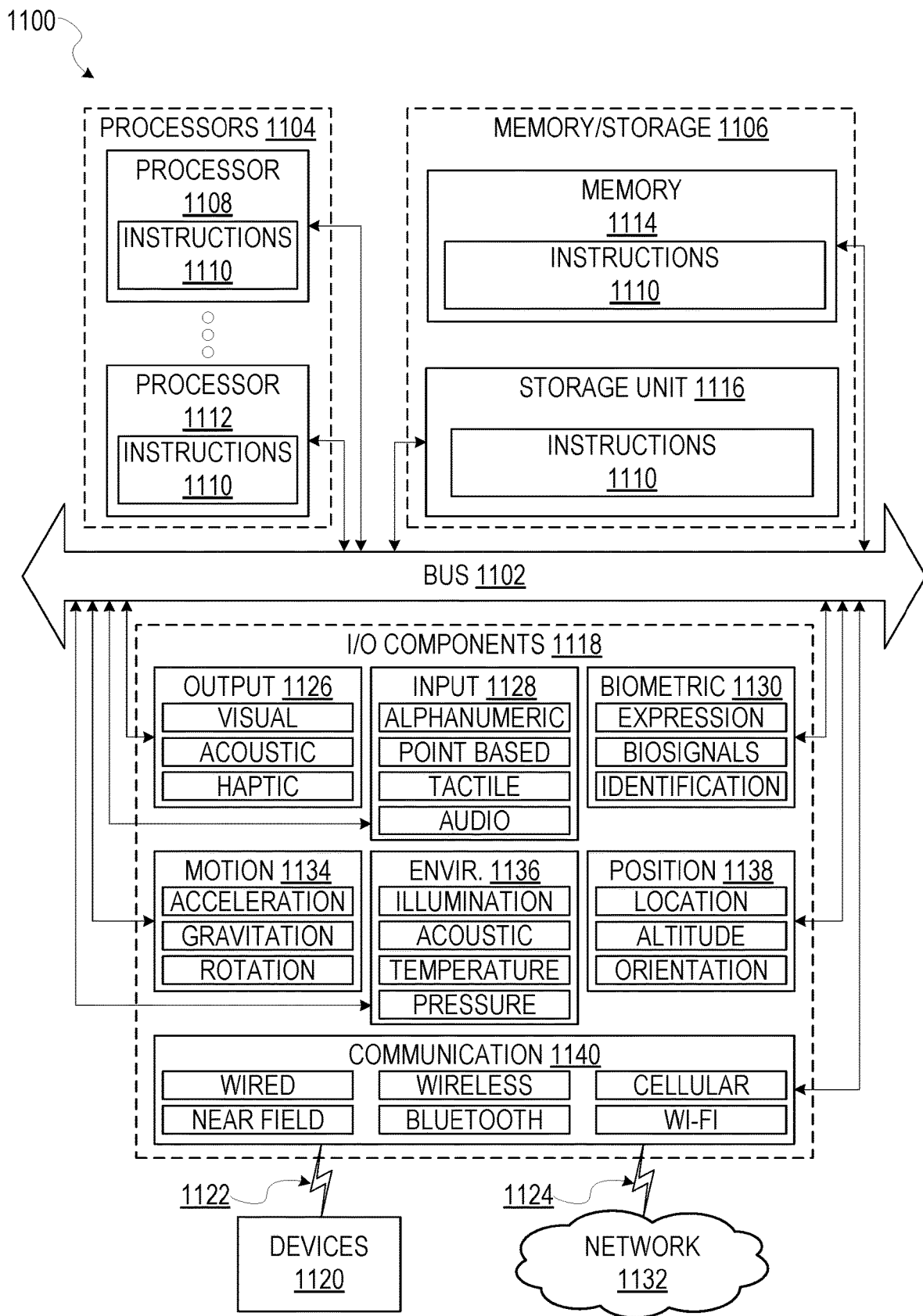
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1110(e.g., software, a program, an application, an applet, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1110, sequentially or otherwise, that specify actions to be taken by machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory memory/storage 1106, and I/O components 1118, which may be configured to communicate with each other such as via a bus 1102. The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor's cache memory), or any suitable combination thereof, during execution thereof by the machine 1100. Accordingly, the memory 1114, the storage unit 1116, and the memory of processors 1104 are examples of machine-readable media.

The I/O components 1118 may include a wide variety of components to receive input, provide output, produce output, transmit information, exchange information, capture measurements, and so on. The specific I/O components 1118 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion and the grouping is in no way limiting. In various example embodiments, the I/O components 1118 may include output components 1126 and input components 1128. The output components 1126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1118 may include biometric components 1130, motion components 1134, environmental environment components 1136, or position components 1138 among a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1134 may include acceleration sensor components (e.g., accelerometer), gravitation sensor components, rotation sensor components (e.g., gyroscope), and so forth. The environment components 1136 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1138 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via coupling 1122 and coupling 1124 respectively. For example, the communication components 1140 may include a network interface component or other suitable device to interface with the network 1132. In further examples, communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a Universal Serial Bus (USB)).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

"PHONEME ALIGNMENT" in this context, a phoneme is a unit of speech that differentiates one word from another. One phoneme may consist of a sequence of closure, burst, and aspiration events; or, a dipthong may transition from a back vowel to a front vowel. A speech signal may therefore be described not only by what phonemes it contains, but also the locations of the phonemes. Phoneme alignment may therefore be described as a "time-alignment" of phonemes in a waveform, in order to determine an appropriate sequence and location of each phoneme in a speech signal.

"AUDIO-TO-VISUAL CONVERSION" in this context refers to the conversion of audible speech signals into visible speech, wherein the visible speech may include a mouth shape representative of the audible speech signal.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:

1. A method comprising:
    causing display of a first message within a chat interface at a client device, the first message including first content that comprises a graphical avatar;
    receiving a user input to display an interface element to compose a response to the first message within the chat interface at the client device;
    identifying at least a second content that comprises personalized media content from among a collection of content based on a usage metric of the second content, the personalized media content comprising an avatar associated with a user of the client device, and the usage metric indicating a number of times that the personalized media content is selected by the user of the client device subsequent to receiving the graphical avatar of the first content within a message;
    determining a ranking of the second content among the collection of content based on the usage metric of the second content; and
    causing display of a presentation of the collection of content within the interface element at the client device, the presentation of the collection of content including a display of the second content at a position among the collection of content based on the ranking.

2. The method of claim 1, wherein a sorting of at least a portion of the collection of content of the presentation is randomized.

3. The method of claim 1, wherein the method further comprises:
    causing display of a second message within the chat interface at the client device, the second message comprising a text string;
    converting the text string to a tag in response to the causing display of the second message within the chat interface at the client device;
    identifying the first content based on the tag; and
    generating a presentation of the collection of content in response to the identifying the first content based on the tag, the presentation including a display of the second content at a position among the collection of content, the position based on the usage metric that corresponds with a content pair that includes the first content and the second content; and
    causing display of the presentation of the collection of content within the chat interface at the client device.

4. The method of claim 3, wherein the method further comprises:
    associating the tag with the first content within a database; and
    identifying the first content based on the tag within the database.

5. The method of claim 1, wherein the client device is associated with a user profile, and the method further comprises:
    associating the ranking of the second content among the collection of content with the user profile associated with the client device.

6. The method of claim 1, wherein the message includes an ephemeral message.

7. A system comprising:
a memory; and
at least one hardware processor coupled to the memory and comprising instructions that causes the system to perform operations comprising:
    causing display of a first message within a chat interface at a client device, the first message including first content that comprises a graphical avatar;
    receiving a user input to display an interface element to compose a response to the first message within the chat interface at the client device;
    identifying at least a second content that comprises personalized media content from among a collection of content based on a usage metric of the second content, the personalized media content comprising an avatar associated with a user of the client device, and the usage metric indicating a number of times that the personalized media content is selected by the user of the client device subsequent to receiving the graphical avatar of the first content within a message;

determining a ranking of the second content among the collection of content based on the usage metric of the second content; and causing display of a presentation of the collection of content within the interface element at the client device, the presentation of the collection of content including a display of the second content at a position among the collection of content based on the ranking.

8. The system of claim 7, wherein a sorting of at least a portion of the collection of content of the presentation is randomized.

9. The system of claim 7, wherein the instructions cause the system to perform operations further comprising:

causing display of a second message within the chat interface at the client device, the second message comprising a text string;

converting the text string to a tag in response to the causing display of the second message within the chat interface at the client device;

identifying the first content based on the tag; and generating a presentation of the collection of content in response to the identifying the first content based on the tag, the presentation including a display of the second content at a position among the collection of content, the position based on the usage metric that corresponds with a content pair that includes the first content and the second content; and causing display of the presentation of the collection of content within the chat interface at the client device.

10. The system of claim 9, wherein the instructions cause the system to perform operations further comprising:

associating the tag with the first content within a database; and identifying the first content based on the tag within the database.

11. The system of claim 7, wherein the client device is associated with a user profile, and the instructions cause the system to perform operations further comprising:

associating the ranking of the second content among the collection of content with the user profile associated with the client device.

12. A non-transitory machine-readable storage medium comprising instructions that, when executed by one or more processors of a machine, cause the machine to perform operations comprising:

causing display of a first message within a chat interface at a client device, the first message including first content that comprises a graphical avatar;

receiving a user input to display an interface element to compose a response to the first message within the chat interface at the client device;

identifying at least a second content that comprises personalized media content from among a collection of content based on a usage metric of the second content, the personalized media content comprising an avatar associated with a user of the client device, and the usage metric indicating a number of times that the personalized media content is selected by the user of the client device subsequent to receiving the graphical avatar of the first content within a message;

determining a ranking of the second content among the collection of content based on the usage metric of the second content; and causing display of a presentation of the collection of content within the interface element at the client device, the presentation of the collection of content including a display of the second content at a position among the collection of content based on the ranking.

13. The non-transitory machine-readable storage medium of claim 12, wherein a sorting of at least a portion of the collection of content of the presentation is randomized.

14. The non-transitory machine-readable storage medium of claim 12, wherein the instructions cause the machine to perform operations further comprising:

causing display of a second message within the chat interface at the client device, the second message comprising a text string;

converting the text string to a tag in response to the causing display of the second message within the chat interface at the client device;

identifying the first content based on the tag; and generating a presentation of the collection of content in response to the identifying the first content based on the tag, the presentation including a display of the second content at a position among the collection of content, the position based on the usage metric that corresponds with a content pair that includes the first content and the second content; and causing display of the presentation of the collection of content within the chat interface at the client device.

* * * * *